(12) United States Patent
Jones et al.

(10) Patent No.: US 7,716,252 B2
(45) Date of Patent: May 11, 2010

(54) DYNAMICALLY EXPOSING RELATIONSHIPS AMONG ENTITIES CONTAINED IN DATA STORES

(75) Inventors: Jeffrey D. Jones, Redmond, WA (US); Kenneth M. Hansen, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 301 days.

(21) Appl. No.: 11/192,509

(22) Filed: Jul. 29, 2005

(65) Prior Publication Data
US 2007/0027898 A1 Feb. 1, 2007

(51) Int. Cl.
G06F 7/00 (2006.01)
G06F 17/00 (2006.01)
(52) U.S. Cl. .................. 707/802; 707/805
(58) Field of Classification Search ............ None
See application file for complete search history.

(56) References Cited

U.S. PATENT DOCUMENTS

| | | | | | |
|---|---|---|---|---|---|
| 5,437,027 | A | * | 7/1995 | Bannon et al. | 707/103 R |
| 5,627,979 | A | * | 5/1997 | Chang et al. | 715/763 |
| 5,721,900 | A | * | 2/1998 | Banning et al. | 707/4 |
| 2002/0030703 | A1 | * | 3/2002 | Robertson et al. | 345/853 |
| 2003/0004964 | A1 | * | 1/2003 | Cameron et al. | 707/103 R |
| 2004/0230987 | A1 | * | 11/2004 | Snover et al. | 719/320 |
| 2004/0243543 | A1 | * | 12/2004 | Snover | 707/1 |
| 2005/0004973 | A1 | * | 1/2005 | Snover et al. | 709/200 |

OTHER PUBLICATIONS

Microsoft Access Tutorial, http://www.bcschools.net/staff/AccessHelp.htm, Feb. 15, 2001 as dated by the Internet Archive Wayback Machine.*

* cited by examiner

Primary Examiner—Tim T. Vo
Assistant Examiner—Garrett Smith
(74) Attorney, Agent, or Firm—Lee & Hayes, PLLC

(57) ABSTRACT

Dynamically exposing relationships among entities contained in data stores. A method disclosed herein can include receiving data related to a given object that is contained in a given data store, and dynamically determining one or more relationships between the given object and one or more further objects. These relationships can include group memberships, management relationships, containment relationships, or the like. As the data related to the stored objects changes, the relationships among the objects can be updated. Once the relationships are defined, representations thereof may be presented to a user via a suitable user interface. The user interface may present these relationships as graphic icons, hypertext, or the like, and may further depict the dynamic relationships distinctly from static directory listings. The user may then navigate these relationships by interacting with these representations.

14 Claims, 7 Drawing Sheets

DYNAMICALLY EXPOSING RELATIONSHIPS AMONG ENTITIES CONTAINED IN DATA STORES

BACKGROUND

In traditional command line environments, users can navigate through a file system or data store using a containment relationship of the directories and files that are stored in the file system or data store. Users can also navigate across links that have been statically defined within that file system. These links may have been defined by the users themselves, or may come pre-defined when the file system is installed. In any event, these links may be characterized as static links, in that they are in some sense predefined and unchanging absent active user intervention.

In graphical user interface (GUI) environments, users may create icons that represent shortcuts to files, folders, or applications. By clicking or otherwise interacting with such icons, the user may proceed directly to the file, folder, or application to which that shortcut points, without browsing or navigating through an intermediate directory structure.

SUMMARY

The subject matter described herein pertains to dynamically exposing relationships among entities contained in data stores. One or more objects are contained in a data store, and data that is related to such objects is received. One or more relationships between the given object and one or more further objects are dynamically determined. These relationships can include group memberships, management relationships, containment relationships, or the like. As the data related to the stored objects changes, the relationships among the objects can be updated.

Once the relationships are defined, representations thereof may be presented to a user via a suitable user interface, such as a programmatic interface, a command line interface, and graphical interface. The user interface may present these relationships as graphic icons, hypertext, or the like, and may further depict the dynamic relationships distinctly from static directory listings. The user may then navigate these relationships by interacting with these representations.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The same numbers are used throughout the drawings to reference like features and components. In the figures, the left-most digit(s) of a reference number identifies the figure in which the reference number first appears. The use of the same reference numbers in different figures indicates similar or identical items.

DETAILED DESCRIPTION

Figure 1:
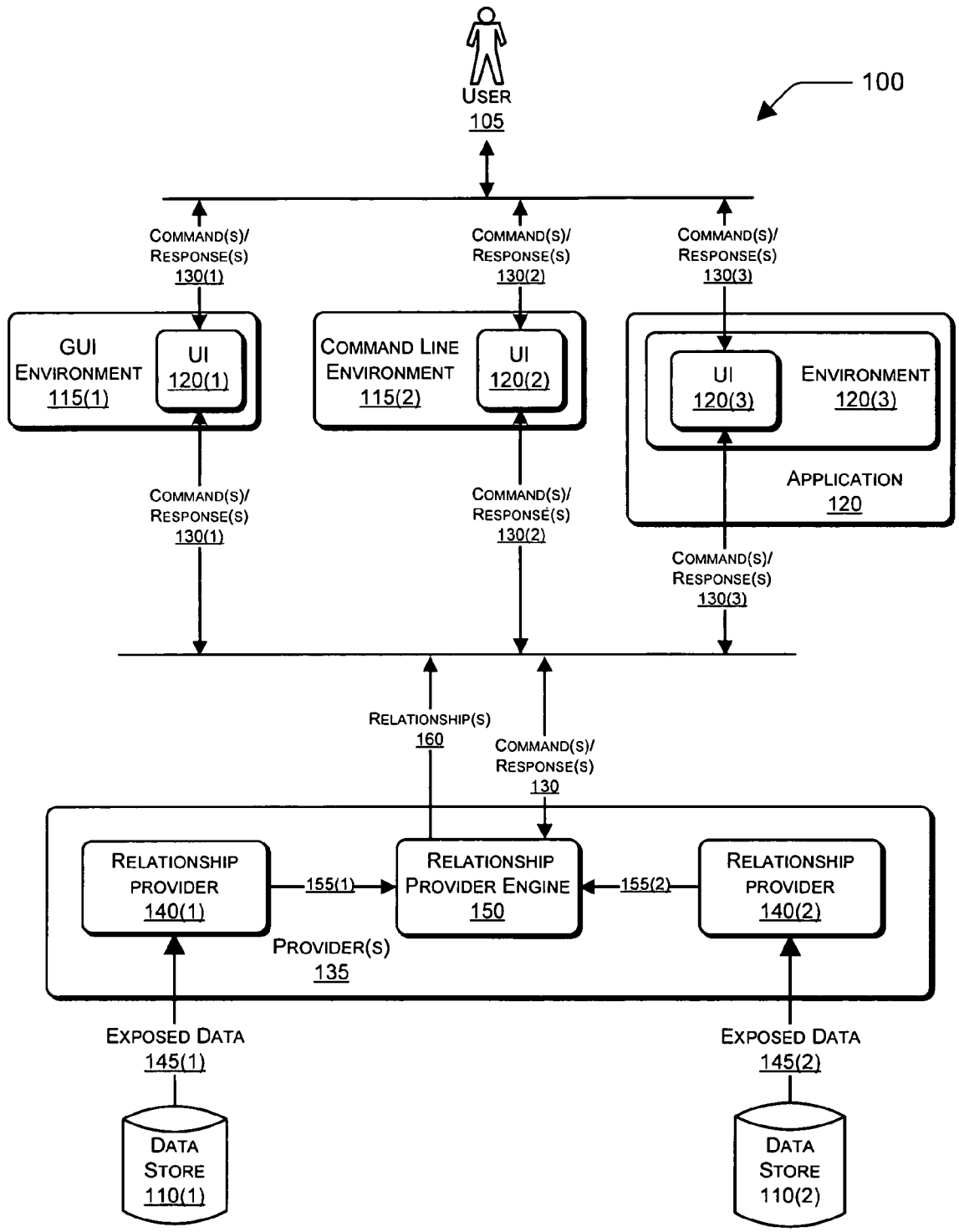
FIG. 1 is a block diagram illustrating an architecture for dynamically exposing relationships among entities contained in data stores.

FIG. 1 illustrates an architecture 100 for dynamically exposing relationships among entities contained in data stores. A user 105 may browse, navigate, or otherwise obtain information regarding data stored in one or more data stores 110(1) and/or 110(2), which are collectively referred to herein as data stores 110. In an illustrative but non-limiting embodiment shown in FIG. 1, the data store 110(1) can take the form of, for example, a file system 110(1), and the data store 110(2) can take the form of, for example, a directory structure 110(2).

The file system 110(1) can be implemented as a kernel component that registers itself with an input/output (I/O) manager as an active file system. There can be several types of file systems 110(1), including local (network) file systems and remote (distributed) file systems. Several file systems can be active at the same time, and can be dynamically located when a volume is mounted or when a remote name is being resolved. The I/O manager can sequentially call each registered file system until one file system recognizes the volume structure or remote name. In general, the file system 110 is an example of a data store that can serve as either the source or destination of a relationship.

The directory structure 110(2) can be implemented using, for example, the ACTIVE DIRECTORY® directory service, which is available from Microsoft. The ACTIVE DIRECTORY® service enables the management of the identities and relationships that define network environments. The ACTIVE DIRECTORY® service is a Microsoft technology, part of Active Platform, that enables applications to find, use, and manage directory resources (such as user names, network printers, and permissions) in a distributed computing environment. Distributed environments are usually heterogeneous collections of networks that often run proprietary directory services from different providers. To simplify directory-related activities such as locating and administering network users and resources, Active Directory presents applications with a single set of interfaces that eliminate the need to deal with differences among these proprietary services. Active Directory is a component of Microsoft Windows Open Services Architecture (WOSA).

It is understood that the file system 110(1) and the directory structure 110(2) as shown in FIG. 1 are provided only for convenience of illustration and discussion, and do not limit the teachings herein. For example, other implementations could also include two or more file systems 110(1), and/or two or more directory structures 110(2).

The user 105 may interact with an environment 115(1) that is based on Graphical User Interface (GUI) technology, and/or with an environment 115(2) that is based on command line shell technology. Another example environment shown in FIG. 1 is an environment 115(3) that is embedded within an application 120. This application 120 can be realized as, for example, as a web-based service or executing on a general-purpose computing system or other device.

A suitable but non-limiting example of the GUI environment 115(1) is any of the WINDOWS® family of operating systems available from Microsoft Corporation of Redmond, Wash. (hereinafter "Microsoft"), and any application software that is compatible with WINDOWS® operating systems. A suitable example of such an environment 115(2) is any of the command shell environments supported by the WINDOWS® family of operating systems, available from Microsoft. For convenience, the environments 115(1), 115 (2), and 115(3) are collectively referred to herein as environments 115.

It is understood that the foregoing examples are provided for convenience of discussion and illustration, and do not limit the subject matter disclosed herein. It is further understood that users 105 may access the different environments 115 either concurrently or separately in different implementations of the teachings herein. Also, the environments 115 could be implemented as separate environments, or could be implemented as integrated environments, according to different embodiments of the teachings herein.

The environments 115 can each include respective user interfaces, which are shown as 125(1), 125(2), and 125(3) in the environments 115 depicted in FIG. 1. User interfaces 125(1), 125(2), and 125(3) are referred to collectively herein as user interfaces 125, and are described in more detail in connection with FIG. 7 below. The user 105 can issue various commands relating to browsing or manipulating the contents of the data stores 110 via the user interfaces 125. The commands and any responses thereto received by the user 105 through the respective user interfaces 125 are represented by the reference numerals 130(1), 130(2), and 130(3), and are referred to herein collectively as commands 130 or responses 130 for convenience of description and illustration.

These commands 130 from the user 105 are passed through one or more of the environments 115 to one or more providers 135. The providers 135 can be, for example, Cmdlet Providers 135 that are available from Microsoft. Cmdlets are described further below in connection with FIG. 6. The providers 135 allow the user 105 to navigate the containment or contents of the data stores 110. The providers 135 can include a respective relationship provider 140(1) for the file system 110(1), and a respective relationship provider 140(2) for the directory structure 110(2). The respective relationship providers 140(1) and 140(2) are referred to herein collectively as relationship providers 140 for convenience.

The relationship providers 140 expose respective data 145 (1) and 145(2) from each one of the data stores 110(1) and 110(2). Exposed data 145(1) and 145(2) are referred to herein collectively as exposed data 145 for convenience. The exposed data 145 can include, for example, particular contents of the data stored in the data stores 110, properties of such data, types of such data, or the like.

A relationship provider engine 150 accesses the exposed data 145, for example, through the relationship providers 140. Illustrative data accesses between the relationship provider engine 150 and the relationship providers 140 are represented by the reference numerals 155(1) and 155(2) (collectively, data accesses 155 for convenience). By accessing this exposed data 145 through, for example, the data accesses 155, the relationship provider engine 150 can define relationships among particular data elements or objects stored in the file system 110(1) and/or the directory structure 110(2). Having done so, the relationship provider engine 150 can publish or expose these relationships to the user 105 as relationships data 160, which can be provided via one or more of the user interfaces 120. The relationships data 155 can be considered part of the response data 130 that is provided to the user 105.

It is understood that the data flow for the data accesses 155 and the relationships data 160 are shown in FIG. 1 for convenience of illustration and discussion only, and not to limit the teachings herein. These same comments apply equally to the components through which the data accesses 155 and the relationships data 160 are shown to flow. For example, the relationships data 160 could flow through one or more of the relationship providers 140 on its path to the user 105. Alternatively, the relationships data 160 could pass directly to the user 105 by a different channel altogether, bypassing the providers 135 or relationship providers 140. Also, the data accesses 155 could enable the relationship provider engine 150 to access the exposed data 145 directly from the data stores 110, rather than through the relationship providers 140.

In the architecture 100 shown in FIG. 1, a given relationship provider 140 can correspond to a given data store 110. Accordingly, as data stores 110 are added to or deleted from the architecture 100, corresponding relationship providers 140 can be "plugged" into or out of the relationship provider engine 150. Also, new relationships 160 may be exposed within one or more existing data stores 110, without adding or removing any data stores 110. Thus, new relationships 160 may be added without adding new data stores 110. When a given relationship provider 140 is plugged into the relationship provider engine 150, the relationship provider 140 can then expose data 145 particular to that data store 110 to the relationship provider engine 150. In turn, the relationship provider engine 150 can identify and expose relationships 160 between or among entities in a given data store 110 or in different data stores 110(1) and 110(2). In this sense, the relationship providers 140 may be viewed as being "pluggable" into the relationship provider engine 150, or more generally, "pluggable" into the architecture 100.

The relationship provider engine 150 may be viewed as supporting "pluggable" components, such at the relationship providers 140. The relationship provider engine 150 can communicate with a first relationship provider 140(1) to access information about entities that are provided by or native to first data store 110(1). The relationship provider engine 150 can also communicate with at least a second relationship provider 140(1) to access information about further entities that are provided by or native to at least a second data store 110(2).

As various data stores 110 and related relationship providers 140 are added to the architecture 100, or as the contents or states of these data stores 110 and related components otherwise change over time, the exposed data 145 may also change accordingly. Accordingly, the relationship provider engines 150 in cooperation with the "pluggable" relationship providers 140 can dynamically expose these changing or evolving relationships among the data elements stored in the data stores 110 and revealed in the exposed data 140. From the vantage point of the user 105, the relationship provider engine 150 can serve to virtually unify or integrate two or more data stores 110. Because of this virtual unification or integration, any structural or organizational differences between the two data stores 110 do not impede the definition of relationships between objects stored in these two data stores 110, and do not impede navigation from objects in these data stores 110.

Figure 2:
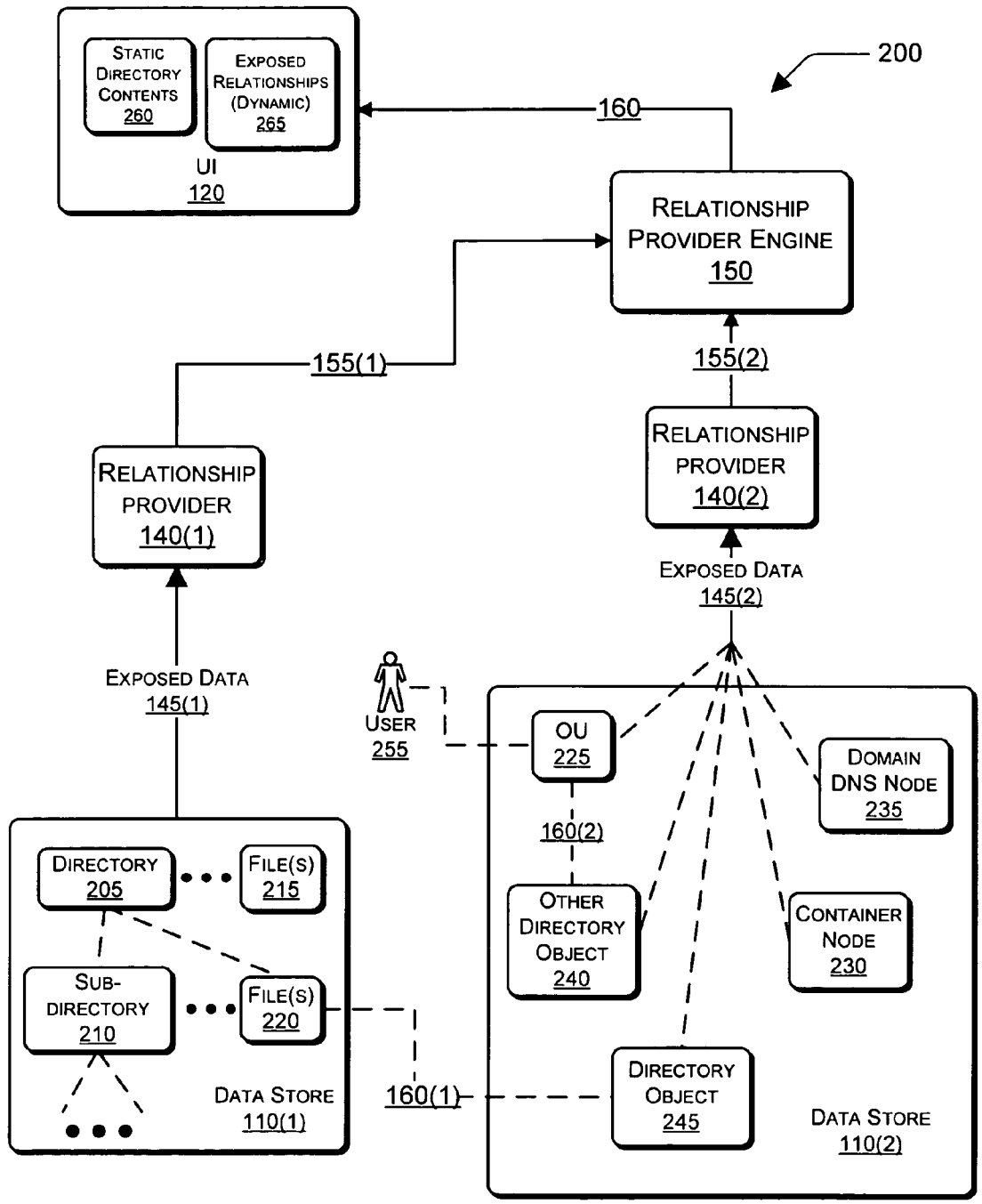
FIG. 2 is a block diagram illustrating further details of the architecture shown in FIG. 1.

FIG. 2 illustrates further details 200 of the architecture 100 shown in FIG. 1. The relationship provider engine 150, the relationship providers 140, the data flows 145, 155, and 160 related thereto, and the data stores 110 are carried forward from FIG. 1. However, FIG. 2 illustrates example contents of the data stores 110 in more detail, as well as illustrating relationships there-between that can be exposed dynamically according to the subject matter taught herein.

Turning first to the data store 110(1), it may be described as containing one or more "containers". The term "container" may refer to a directory 205, which may be a "top level" or "root" directory within the data store 110(1). The directory 205 can contain files 215 and other containers. These other containers can include, for example, subdirectory 210, which in turn can contain one or more files 220. It is understood that the subdirectory 210, in turn, may contain further subdirectories and file, and so on. However, for convenience and clarity, only one subdirectory 210 is shown in FIG. 2.

Turning now to the data store 110(2), assume only for the sake of the illustrative implementation shown in FIG. 2 that this data store 110(2) is implemented using the ACTIVE DIRECTORY® service, which was discussed above. In the context of the data store 110(2), the term "container" can refer to a node 225 that may be implemented as an ACTIVE DIRECTORY® Organizational Unit (OU). An OU is a type of directory object contained within domains, and is a container into which users, groups, computers, and other organizational units can be placed.

The term "container" can also refer to a node 230 that may be implemented as an ACTIVE DIRECTORY® Container. In the context of Active Directory, the term "container" can refer to an object of the container structural class, or an object that has child objects.

The term "container" can also refer to a node 235 that is associated with domain controller locations and naming under the Domain Name System (DNS). Finally, the term "container" can refer to any other directory object type 240. Any of the foregoing can, in turn, contain other directory objects of any type.

Recall that the relationship provider engine 150 shown in FIG. 1 can define and reveal, as a first non-limiting example, one or more relationships 160(1) between entities associated with the relationship providers 140. Also, the relationship provider engine 150 can define and reveal, as a further non-limiting example, one or more relationships 160(2) within an entity associated with a given relationship provider 140. The relationship provider engine 150 can perform any of the foregoing using the data 145 exposed to or by the relationship providers 140. These relationships 160 can be exposed dynamically based on the data, properties, or type of the items in the data stores 110 that are exposed through the relationship providers 140. As represented generally by the relationship data 160(1) or 160(2) (collectively, relationships 160) as shown in FIG. 2, these revealed or defined relationships 160 can map an item at one path to an item at another path. In the example shown in FIG. 2, the relationship data 160(1) indicates that the file 220 in the data store 110(1) is related to a directory object 245 in the other data store 110(2). Also in FIG. 2, the relationship data 160(2) indicates that the OU 225 is related to the directory object 240.

It is understood that the relationship data 160 is shown in FIG. 2 for discussion only, and not for limitation. More particularly, the relationship data 160 may relate data, items, objects, properties of data, or the like that may appear in the same data store 110. However, the relationship data 160 may also relate data elements, items, objects, or the like that may appear in any number of different data stores 110. It is further understood that the relationship data 160 can relate two or more data elements, items, objects, or the like. Finally, the relationships represented by the relationship data 160 may be characterized as one-to-many, one-to-one, many-to-one, many-to-many, or the like.

As an example of the foregoing discussion, assume that data pertaining to a particular user 255, who may or may not be the user 105 shown in FIG. 1, is contained in the data store 110(2). More particularly, data pertaining to the particular user 255 may be stored in a user object associated with a particular OU 225. Given the contents of the particular OU 225 corresponding to the user 255, the relationship provider engine 150 may determine the group or groups in which the user 255 is a member. A MemberOf relationship associated with the OU 225 may facilitate this determination. In this example, relationship data 160(2) could link the OU 225 with a further directory object 240, which is assumed to indicate or correspond to the group or groups of which the particular user 255 is a member. It is understood that this determination may be repeated recursively to investigate and determine what group or groups the user 255 is in, and in turn what group or groups that group is in. Should the group membership of the user 255 change, or should the composition or definition of particular groups change, the corresponding relationship data 160(2) can be updated dynamically by the relationship provider 140.

Assume further that the user 105 is an administrator or other user 105 with requisite rights or privileges to access the contents of the data store 110(2). The user 105 may navigate the data store 110(2) by utilizing, at least in part, the relationship provider 140(2). Thus, in this example, the command data 130 (FIG. 1) may take the form of navigation commands issued by the user 105, and the response data 130 corresponding thereto can take the form of directory listings of the like that are provided to the user 105 in response to these commands. The user 105 may accordingly navigate to the directory that contains the OU 225, which in turn pertains to the particular user 255. Should the user 105 navigate to this OU 225, the relationship provider 140(2) may list the OU 225, along with other static or pre-defined contents of the directory in which the OU 225 resides. This static data can be provided using, for example, a representative user interface 120, which can be, for example, any of the interfaces 120 described above in connection with FIG. 1 or any of the displays described below in connection with FIG. 7.

The user interface 120 as shown in FIG. 2 can include a first area or field 260 that can contain depictions or representations of relatively static contents of, for example, a given directory or file system structure. The user interface 120 can also include at least a further area or field 265 that can contain depictions or representations of the relationship data 160 exposed by the relationship provider engine 150. In some embodiments, the representation of the relationship data 160 in field 265 may be highlighted, or otherwise rendered to the user 105 in a manner that distinguishes it from the static directory contents shown in field 260. In such embodiments, this highlight or rendering may take the form of, for example, special coloration, typeface, or the like that may be applied to content rendered in field 265 as compared to field 260. Also in such embodiments, the representation of the relationship data 160 in field 265 may be rendered as one or more graphic icons, as hyper-text, or the like.

In other embodiments, the content in fields 260 and 265 may be rendered alike, such that the user 105 may not readily distinguish the static directory contents from the dynamic relationship data 160. These embodiments may be suitable for implementations wherein it is desired to make the differences in the static and dynamic content, shown respectively in fields 260 and 265, transparent to the user 105.

It is noted that the user interface 120 and the fields 260 and 265 are shown in block form for clarity and conciseness in illustration and discussion, and not to limit possible applications of the teachings herein. More particularly, the static and dynamic content displayed respectively in the fields 260 and 265 may be arranged in any suitable configuration for presentation to the user 105. For example, the content shown in the fields 260 and 265 may be displayed separated from one another, or may be integrated and displayed together.

In any event, by interacting with content shown in field 265, such an icon or hyper-text, the user 105 may navigate from, for example, the OU 225 corresponding to the user 255 to one or more objects 240 corresponding to or representing the group or groups of which the user 255 is a member. In this manner, the user 105 can quickly navigate and investigate the group membership of the user 255 using the relationship data 160(2). In this example, the OU 225 may be viewed as an origin object from which the user 105 may navigate, and the object 240 may be viewed as a destination object to which the user 105 may navigate. Using this terminology, it is understood that the origin object and the destination object may reside in the same data store 110 or in different data stores 110.

In connection with the user interface (UI) 120, the relationship provider engine 150 can facilitate not only a listing of the relatively static contents of a given directory via field 260, but can also facilitate a representation of the dynamic relationship data 160 via field 265. For example, the relationship provider engine 150 can cause the UI 120 to depict in field 265 the relationship data 160(2) that relates the user 255 and the OU 225. Recall that in this example, the relationship data 160(2) dynamically indicates the group or groups in which the user 255 is a member.

The above non-limiting example discusses group membership of a particular user 255, and the data objects representing that group membership, such as other directory object 240. However, in other examples, the teachings herein may be applied to define and expose other types of relationships 160 involving particular objects in the data stores 110 or involving users 255 whose data is stored in the data stores 110. For example, containment relationships 160 of particular objects may be defined and exposed to the user 105 for navigation. Also, management relationships 160 of given users 255 may be defined and exposed to the user 105 for navigation. Such management relationships 160 can indicate who manages the user 255, or who is managed by the user 255, for example. In short, the types and nature of the relationships represented by the relationship data 160 can be as dynamic as the underlying data stored in the data stores 110.

Figure 3:
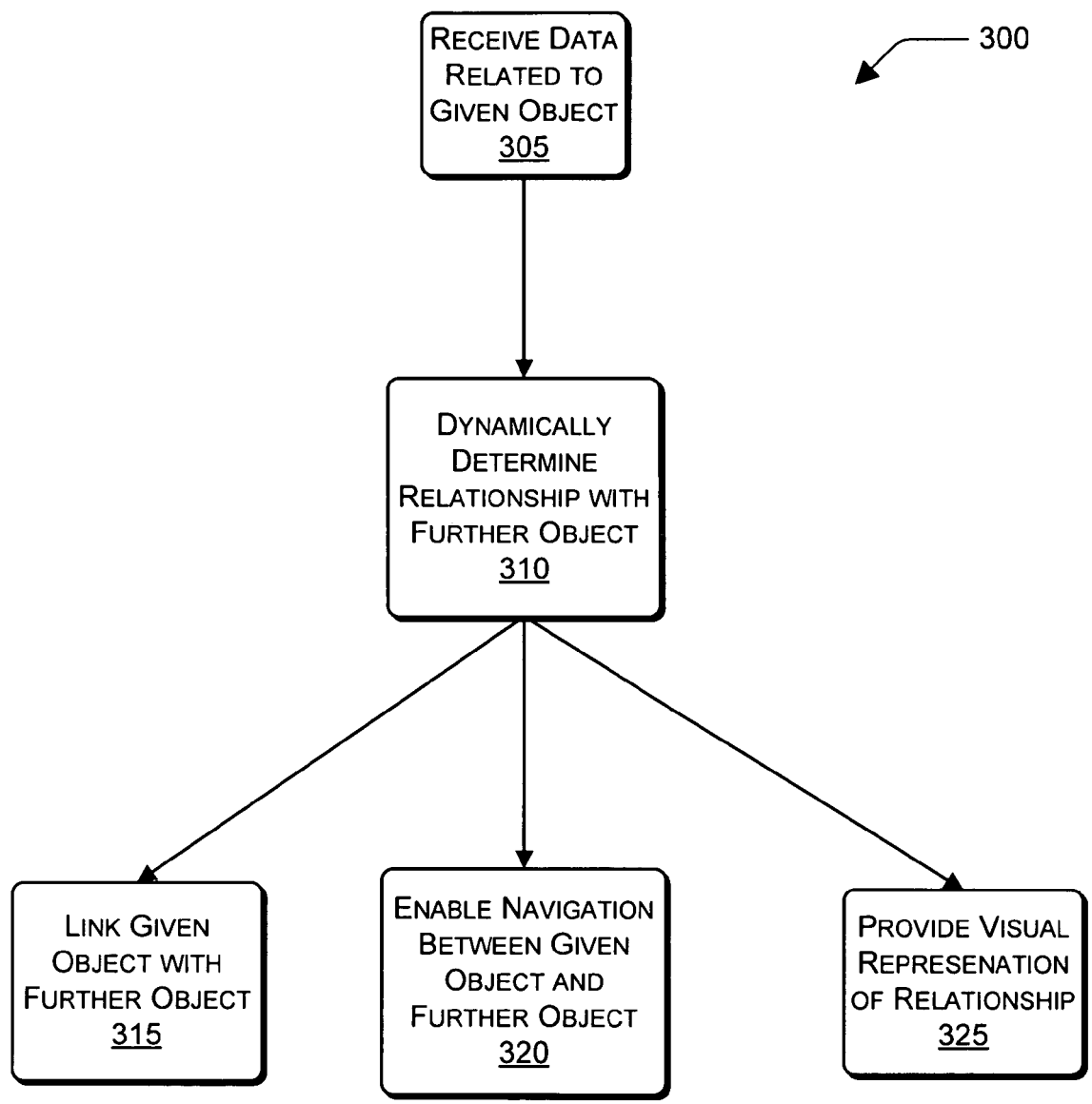
FIG. 3 is a flowchart illustrating a process flow that may be performed to dynamically expose relationships among entities contained in data stores.

FIG. 3 illustrates a process flow 300 that may be performed to dynamically expose relationships 160 among entities contained in data stores 110. While some or all of the process flow 300 is described herein as being performed by the relationship providers 140 and the relationship provider engine 150 shown in FIGS. 1 and 2, it is understood that some or all of the process flow 300 may also be performed by other structure or components.

In block 305, data related to a given object or entity in a data store 110 is received by, for example, the relationship provider engine 150. This data can take the form of data 145 that can be exposed directly to the relationship provider engine 150. Alternatively, the data 145 may also be exposed by way of the relationship providers 140 shown in FIGS. 1 and 2, as indicated by the data accesses represented by lines 155(1) and 155(2).

In block 310, the data received in block 305 is analyzed to determine dynamically a relationship 160 between the given object or entity (i.e., an origin object) and one or more other objects or entities (i.e., one or more destination objects). This analysis can be performed by, for example, the relationship provider engine 150. Having determined this relationship 160 between the origin object or entity and the one or more destination objects, the process flow 300 can include linking the origin object with the one or more destination objects (block 315). Also, the process flow 300 can include enabling navigation between the origin object and the one or more destination objects (block 320). This navigation can be performed by, for example, the user 105 shown in FIGS. 1 and 2.

Turning to block 325, the process flow 300 can include providing or presenting a graphical or visual representation of the relationship 160 determined in block 310. More particularly, if the user 105 has navigated to the origin object, the process flow 300 can include providing a representation of the destination object that is visible to the user 105 through, for example, the user interfaces 120. As discussed above, examples of this representation of the destination object can include graphical icons, hypertext links, or the like.

Figure 4:
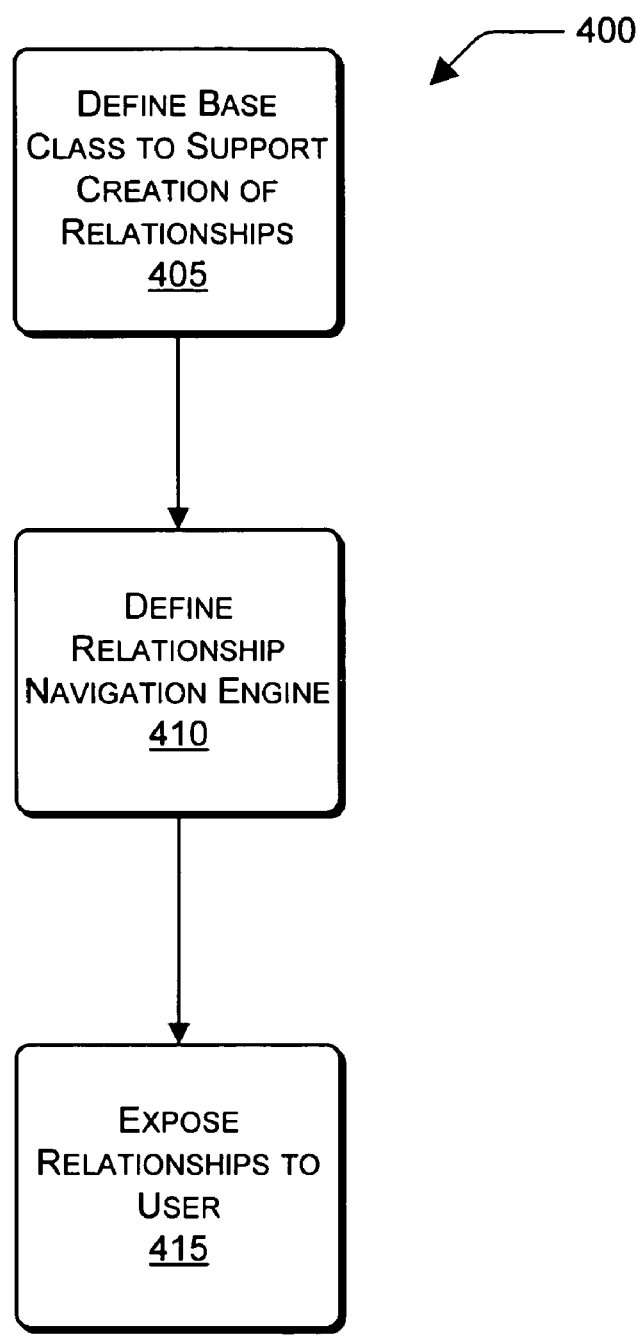
FIG. 4 is a flowchart illustrating three illustrative aspects of definition and navigation of relationships.

FIG. 4 illustrates three illustrative aspects 400 of definition and navigation of relationships 160. In block 405, a base class can be defined that enables creation or representation of one or more relationships 160 between one provider 135 and another provider 135, between one relationship provider 140 and another relationship provider 140, or between one data store 110 and another data store 110. Alternatively, these relationships 160 can be defined within the same provider 135, relationship provider 140, or data store 110.

In block 410, a relationship provider engine 150 that routes calls to one or more relationship providers 140 is defined. The relationship provider engine 150 is discussed further in connection with FIG. 6 below.

In block 415, Cmdlets are defined that facilitate defining the relationships 160 and exposing the defined relationships 160 to the end user 105. The term Cmdlet (pronounced "command let") is used herein to refer to a light-weight command that may be provided by a given environment 115. Several illustrative cmdlets are referenced as 620 in FIG. 6, and discussed in detail below in connection with FIG. 6. These Cmdlets can differ from commands in other environments in several ways:

Cmdlets can be implemented as, for example, an instance of a .NET Class, rather than as a stand-alone executable.

Cmdlets can be created with as few as a dozen lines of code; other commands may involve more extensive programming.

In general, Cmdlets do not perform their own parsing, error presentation, or formatting/output. Instead, these functions can be handled by an engine common across a number of Cmdlets:

Attributes can be used to identify input parameters to a common parser or for prompting; and Common API's can be provided for output and error presentation.

Cmdlets can process objects, rather than streams of text, from their input and can deliver objects to their output.

Cmdlets can be record oriented, processing a single object at a time.

The cmdlets may also expose functionality related to the defined relationships 160 to the end user 105. For example, the cmdlets may enable the end user 105 to navigate from one data store 110(1) to another data store 110(2) based on a relationship 160 discovered or defined between items stored in these two data stores 110(1) and 110(2).

1. Relationship Provider 140

Figure 5:
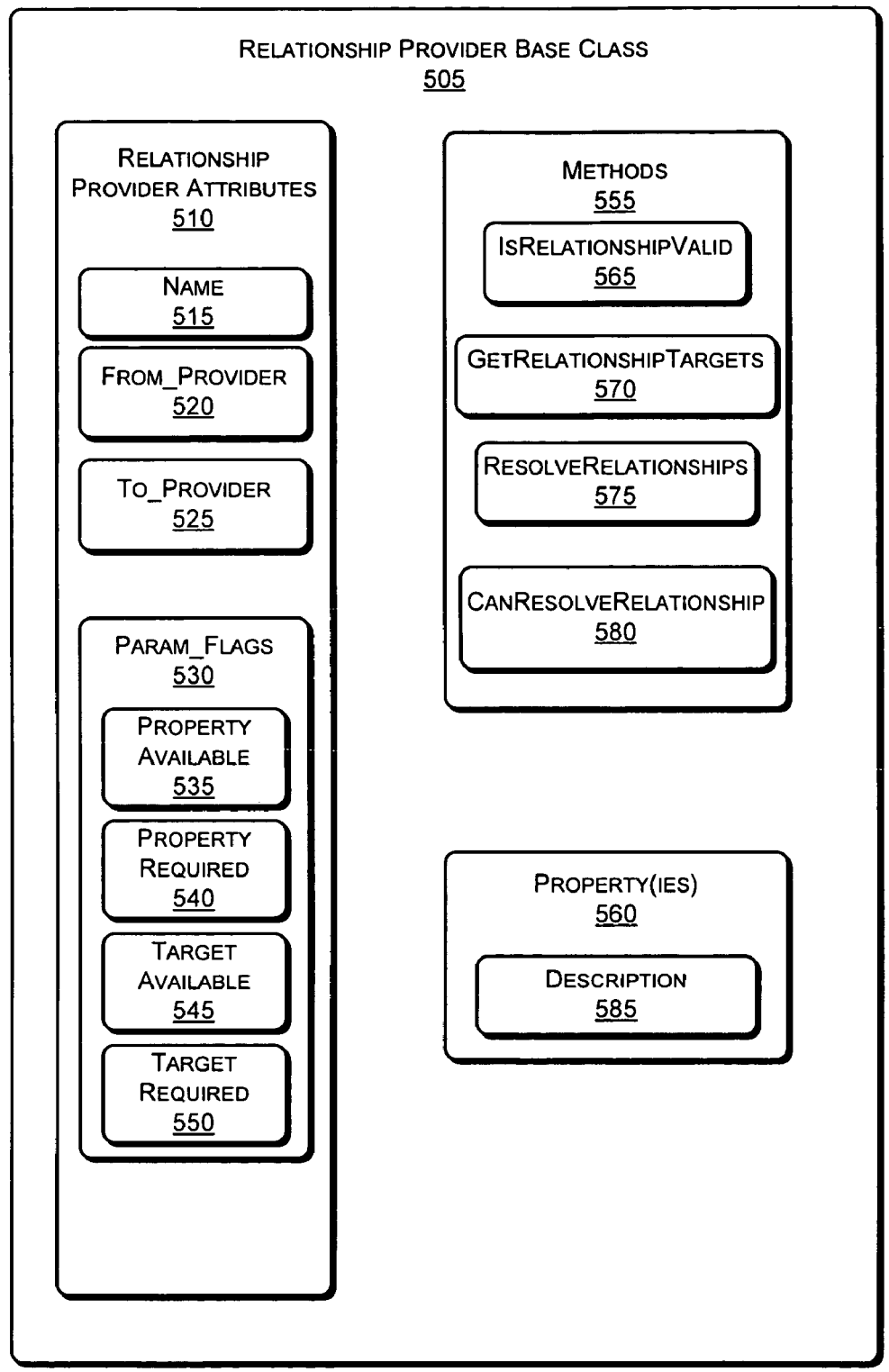
FIG. 5 is a block diagram illustrating a base class suitable for implementing a relationship provider.

FIG. 5 illustrates a base class 505 suitable for a relationship provider 140. A class for the Relationship Provider 140 can be defined by derivation from a Relationship Provider base class 505, which in turn can be defined with at least one Relationship Provider Attribute 510.

Relationship Provider Attribute 510

The Relationship Provider Attribute 510 can be placed on the class that derives from the Relationship Provider base class 505. The attribute 510 can contain a Name field 515, a FromProvider field 520, a ToProvider field 525, and one or more ParameterFlags fields 530.

The Name field 515 can be exposed to the end user 105 to identify the relationship 160. The FromProvider field 520 can identify the provider 135, relationship provider 140, or data store 110 from which the relationship 160 originates.

The ToProvider field 525 can identify the provider 135, relationship provider 140, or data store 110 to which the relationship 160 maps or links. Note that the FromProvider field 520 and the ToProvider field 525 can identify the same provider 130, relationship provider 140, or data store 110. These fields 520 and 525 can also contain wildcard patterns that allow the specified relationship 160 to be valid for source and destination providers that match the wildcard pattern.

The ParameterFlags field 530 can identify any additional parameters that may be required and/or available for the specified relationship 160. Illustrative for this ParameterFlags field 530 can include a PropertyAvailable parameter 535, a PropertyRequired parameter 540, a TargetAvailable parameter 545, and a TargetRequired parameter 550.

b) Base Class for Relationship Provider 140

The base class 505 for the Relationship Provider 140 can be implemented as an abstract class, with one or more methods 555, and one or more abstract properties 560. For illustration only, but not limitation, FIG. 5 shows several methods 555. These methods 555 can be named respectively, for convenience only, a IsRelationshipValid method 565, a GetRelationshipTargets method 570, a ResolveRelationship method 575, and a CanResolveRelationship method 580. These methods 555 can be used by the relationship provider engine 150 (described elsewhere herein, for example, FIGS. 1, 2, and 6) to expose the relationships 160 to the end user 105 through, for example, one or more cmdlets.

To expose a relationship 160, a class can derive from the Relationship Provider base class 505 and override the following methods 555. It can also declare one or more Relationship Provider Attribute(s) 510 on the class, which can contain the name 515 of the relationship 160, the FromProvider 520, the ToProvider 525, and any ParameterFlags 530.

As an example of the foregoing:

```
[RelationshipProvider("members", "ActiveDirectory",
"ActiveDirectory", RelationshipParrnaeterFlags.TargetRequired)]
  Public class MembersRelationshipProvider : RelationshipProvider
  {
  ...
  }
```

(1) Method IsRelationship Valid 565

The method IsRelationshipValid 565 can indicate to the relationship provider engine 150 whether the relationship 160 that this Relationship Provider 140 presents is valid for the given path, property, and target. The method 565 can return true if the relationship 160 is valid, and can return false if the relationship 160 is not valid.

For example, assume that a group defined under an implementation of the Active Directory® service has a Members relationship. If the method 565 is passed a path to an Active Directory® group, it should return true. If the method 565 is passed a path to an Active Directory® user, it should return false, since Active Directory® users do not have a Members relationship.

(2) Method GetRelationshipTargets 570

The method GetRelationshipTargets 570 can return to the relationship provider engine 150 all the targets that are possible to traverse in this relationship 160 given the specified path (and possibly property).

For example, assume that an Active Directory® group has a Members relationship. These members are users in the group. If GetRelationshipTargets 570 is called on a Relationship Provider 140 that services this relationship, the relationship provider engine 150 can look up the Members attribute of the group that is specified by the path, and return the users in that group as unique strings.

(3) Method ResolveRelationship 575

The method ResolveRelationship 575 can perform the mapping from the FromProvider 520 to the ToProvider 525. The method 575 can receive as input the path in the FromProvider 520, and possibly the property and/or target of the relationship 160. Relationship Providers 140 that implement this method 575 can return a path in the space related to the ToProvider 525.

For example, assume that an Active Directory® group has the Members relationship 160. The target for the relationship 160 is the X.500 path of the user 105 to whom the relationship 160 is resolved. The property is implied by the relationship 160 and is "members". Given the path to a group, and the target DN of the member, this method 575 would return a string that represents the path of the member. This could be either provider-qualified (AD::LDAP://mydomain/CN=myUser,DC=mydomain) or drive-qualified (AD:CN=myUser,DC=mydomain), where AD is a drive that was mounted to the defaultNamingContext of the domain.

(4) Method CanResolveRelationship 580

The method CanResolveRelationship 580 can indicate to the relationship provider engine 150 whether the relationship 160 that this Relationship Provider 140 presents can be resolved from a given path, property, and target. More particularly, the method 580 evaluates whether an input relationship 160 can be resolved from a given FromProvider 520 to a given ToProvider 525. The method 580 can return true if the relationship 160 can be resolved, and can return false if the relationship 160 cannot be resolved.

(5) Description Property 585

Recall that the base class 505 can define one or more properties 560. These properties 560 can include a Description Property 585, which can be implemented as a localized string that describes the relationship 160 that the Relationship Provider 140 provides.

2. Relationship Provider Engine 150

Figure 6:
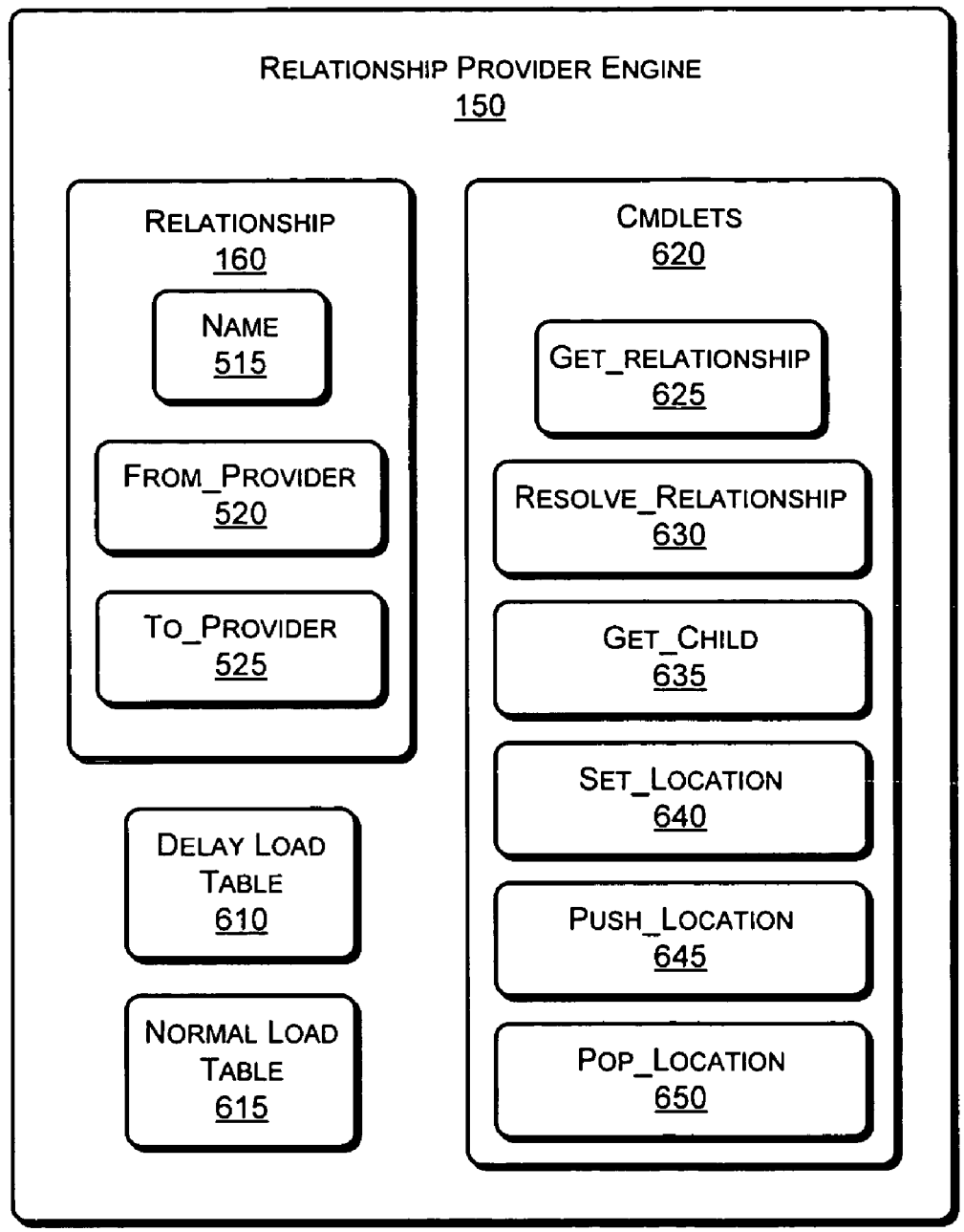
FIG. 6 is a block diagram illustrating an example implementation of a relationship provider engine.

FIG. 6 illustrates an example implementation of the relationship provider engine 150. More particularly, FIG. 6 illustrates data structures and related functionality provided by the relationship provider engine 150 to load, manipulate, and surface the relationships through APIs that can be consumed by providers 135 and cmdlets.

a) Relationship Definition

A relationship 160, illustrated in block form in FIG. 6, can be associated with a name 515, a FromProvider 520, and a ToProvider 525. Sometimes this information alone may be inadequate for a given Relationship Provider 140 to provide the mapping of the "from path" to the "to path" for a given relationship 160. For instance, in the Active Directory® service, there may be a "members" relationship 160 between a group and many users. The "members" attribute on a group object lists the users that are a member of the group. When relationship mapping is performed, the Relationship Provider 140 can determine which user the "to path" should represent. This is exposed through the Target parameter to the cmdlets and Relationship Provider APIs.

Similarly, there are cases in which the property to use for the relationship 160 is provided to the Relationship Provider 140. For instance, assume that a relationship 160 maps a Registry path to a FileSystem path. Given a RegistryKey path that has a property that contains a file system path, the property name is specified in order for the Relationship Provider 140 to know which property of the RegistryKey to read to get the path in the FileSystem.

In the example above referencing the Active Directory® service, this property can be implied by the relationship 160, but the target is nevertheless specified. In the Registry example above, the target can be implied, but the property is nevertheless specified. Given these two examples, other scenarios may involve both a target and a property to be specified.

b) Loading Relationship Providers 140

A Relationship Provider 140 can be identified through CommandDiscovery APIs using, for example, a file such as a *.relationshipprovider file. This file can be created by, for example, running export-command on the assembly containing the Relationship Provider 140. The file can use the RelationshipProviderAttribute to find the class, and to generate an XML file with the name of the relationship 160 as the name of the file with a .relationshipprovider extension. It is understood that the description of this file, including but not limited to the name of the extension of this file, is provided only for ease of description herein, and not to limit the subject matter described therein. Any suitable file extension may be chosen in implementing this embodiment of the subject matter described herein.

Upon invocation of the relationship provider engine 150, a SessionState object can search through, for example, appropriate environment variables to look for .relationshipprovider files in conjunction with .cmdletprovider files. When the SessionState object locates a .relationshipprovider file, it can read that file, create a corresponding RelationshipProviderInfo instance, and put it in a Relationships.RelationshipCollection.

In an alternative to the filename-based approach discussed above, a given relationship provider 140 may provide information about one or more given relationships 160 when the plug-in corresponding to this relationship provider 140 is installed in the relationship provider engine 150. Still other embodiments may use further techniques for finding given relationship providers 140 and/or relationships 160, given the description herein.

If the FromProvider field 520 or the ToProvider field 525 contains any wildcard characters, the RelationshipProviderInfo can also be stored in a "wildcard provider" collection, instead of directly in the RelationshipCollection. After all the CmdletProviders 135 and Relationship Providers 140 have been loaded, each RelationshipProviderInfo in the "wildcard provider" collection can then be processed. For each of the providers 135 or relationship providers 140, the FromProvider field 520 and the ToProvider field 525 can be matched against the existing CmdletProviders. Each match pairing a FromProvider field 520 and a ToProvider field 525 can become a new instance of RelationshipProviderInfo, and be entered into the RelationshipCollection. Any time that New-Provider is called to add a new provider 135 or relationship provider 140, the providers 135 or relationship providers 140 in the "wildcard provider" collection are processed again to find new matches. If new matches are found, then new RelationshipProviderInfo instances are created and added to the RelationshipCollection.

(1) Delay-load Relationships

If a CmdletProvider 135 or relationship provider 140 that is declared as the FromProvider 520 or the ToProvider 525 is not loaded at the time the relationship 160 is loaded, the relationship can be put in a delay-load table 610. In some implementations, relationships 160 in the delay-load table 610 are not shown as valid relationships to the user when the "get-child -relationship", "get-relationship -path", or "resolve-relationship" methods (described below and referenced in FIG. 6 as 635, 625, and 630, respectively) are called. In these implementations, the relationships 160 in the delay-load table 610 are seen only through "get-relationship -all", and can be removed using "remove-relationship".

When a CmdletProvider 135 or relationship provider 140 is added to the system, the relationships 160 in the delay-load table 610 are processed. Any relationships 160 in the delay-load table 610 that are now valid due to the addition of their missing FromProvider 520 or ToProvider 525 are then added to a normal relationship table 615, and become valid relationships 160 that are visible to all the relationship commands.

When a CmdletProvider 135 or relationship provider 140 is removed from the system, the relationships 160 in the normal relationship table 615 are processed, and any that are no longer valid are moved to the delay-load relationship table 610.

c) Manipulating the Loaded Relationship Providers 140

APIs for adding, getting, and removing the relationship providers 140 are exposed to cmdlets (referenced as 620 in FIG. 6 and described below), cmdlet providers 135, and relationship providers 140 through the RelationshipProviderIntrinsics interface, as described below.

RelationshipProviderIntrinsics
  GetAll—property returns all the loaded RelationshipProviderInfo that are in the RelationshipCollection. An overload that takes the relationship name will return all RelationshipProviderInfo objects for relationships of a given name.
  Exceptions:
  No exception will be thrown if no results are found.
  Get—returns the RelationshipProviderInfo for the specified relationship name and "from provider".
  Exceptions:
  ArgumentException if name is null or empty.
  ProviderNotFoundException if no RelationshipProvider is found with that name.
  ProviderInvocationException if the provider 140 exists but threw an exception. The InnerException will be the exception thrown by the provider.
  New—adds a new entry in the RelationshipCollection for the Relationship Provider 140 declared by the .relationshipprovider file at the specified path.

Exceptions:
ArgumentException if path is null or empty.
FileNotFoundException if a .relationshipprovider file could not be found at that path.
ProviderException if a relationship provider 140 with the given name and "from provider" already exists.
Remove—removes the entry in the RelationshipCollection for the specified relationship name.
Exceptions:
ArgumentException if either name or fromProvider is null or empty.
ProviderNotFoundException if a Relationship Provider 140 does not exist with that name and fromProvider.
GetTargets—gets the targets of the specified relationship 160 for the specified path and optionally property. Note, if path is not specified, "." is used.
Exceptions:
ArgumentException if name is null or empty.
ProviderNotFoundException if the specified relationship 160 does not exist.
ProviderInvocationException if the Relationship Provider 140 throws an exception. The InnerException will be the exception that was thrown by the Relationship Provider 140.
Resolve—resolves the relationship 160 into a Path using the specified relationship name, path, and optionally property and target. Note, if path is not specified, "." is used.
Exceptions:
ArgumentException if name is empty or null.
ProviderNotFoundException if the specified relationship does not exist.
ProviderInvocationException if the Relationship Provider 140 throws an exception. The InnerException will be the exception that was thrown by the Relationship Provider 140.

RelationshipProviderInfo
Name—gets the name of the relationship 160 as a string. Note, more than one relationship 160 can have the same name, so the relationship 160 can be distinguished by both name and "from provider".
Exceptions:
None.
FromProvider—gets the provider 135 name from which the relationship provider 140 can resolve a relationship 160. This parameter can be implemented as a string.
Exceptions:
None.
ToProvider—gets the provider name to which the relationship provider 140 can resolve a relationship 160. This parameter can be implemented as a string.
Exceptions:
None.
AssemblyInfo—gets the assembly information for the assembly (a managed code DLL) that implements the relationship provider 140.
Exceptions:
None
Type—gets the type that implements the relationship provider 140.
Exceptions:
If the assembly and/or type have not been loaded any of the following exceptions may occur:
FileNotFoundException,
FileLoadException,
BadImageFormatException, and/or
SecurityException.
ParameterFlags—these flags state whether the property and target arguments are available and/or required for the relationship 160.
The flags may include one or more of the following:
PropertyAvailable,
PropertyRequired,
TargetAvailable, and/or
TargetRequired.
Exceptions:
None
Description—gets or sets the description of the relationship 160
Exceptions:
None c) Using the Relationship Provider Engine 150

FIG. 6 also illustrates several illustrative cmdlets 620 that can be associated with the relationship provider engine 150. The cmdlets 620 can include a get-relationship cmdlet 625, a resolve-relationship cmdlet 630, a get-child cmdlet 635, a set-location cmdlet 640, a push-location cmdlet 645, and a pop-location cmdlet 650. Relationships 160 can be exposed or surfaced for any path for a CmdletProvider 135 or relationship provider 140, and can be discovered by the user 105 through these cmdlets 620.

(1) Get-relationship Cmdlet 625

The get-relationship cmdlet 625 can receive a path as input, and returns all the RelationshipProviderInfo objects for the valid relationships 160 at that path. This can be done by looking up a Provider ID associated with the path and finding all RelationshipProviderInfo objects for that Provider ID. The Provider ID can be the same as the name of the CmdletProvider 135. The FromProvider 520 and ToProvider 525 properties of the base class 505 for the Relationship Provider 140 can use the Provider ID (name) to state the provider 135 or relationship provider 140 to which the relationship 160 maps. Also, it is noted that the Provider ID can also be implied by or inferred from context, and need not be explicitly supplied by a user.

For each of these, the associated RelationshipProvider.IsRelationshipValid( ) method 565 can be called. If true is returned, then the relationship 160 is valid for the given path and the RelationshipProviderInfo can be returned from the get-relationship cmdlet 625.

(2) Resolve-relationship Cmdlet 630

The resolve-relationship cmdlet 630 can receive a path as input, a relationship name 515, and, optionally, a property and a target. The RelationshipProviderInfo is looked up in the RelationshipCollection for the given relationship name and FromProvider 520 (which is inferred from the path). It then gets the appropriate RelationshipProvider 140 instance for that relationship 160 and calls the ResolveRelationship method 575 passing the path, property, and target that were specified. The Relationship Provider 140 then returns the path to which the relationship 160 resolves.

(3) Get-child cmdlet 635

A -Relationship parameter can be added to the get-child cmdlet 635. When this parameter is specified, an optional -Property parameter can also be specified. When called with these parameters, the appropriate Relationship Provider 140 can be found, and the GetRelationshipTargets method 570 can be called with the path and the specified property. The Relationship Provider 140 can return strings indicating the targets that are available for that relationship 160 at that path.

(4) Set-location Cmdlet 640, Push-location Cmdlet 645, and Pop-location Cmdlet 650

A -Relationship parameter can be added to the set-location cmdlet 640. When this parameter is specified, an optional -Property and -Target parameter can also be present. When called with these parameters, the appropriate Relationship Provider 140 can be found and the ResolveRelationship method 575 can be called with the path, and the specified property and target parameters. The Relationship Provider 140 can return an MshPath as a string that the set-location cmdlet 640 uses as the new target of the set-location action. The processing can then proceed as if the set-location cmdlet 640 had been called on the resulting path.

The Push-location cmdlet 645 can behave similarly to the set-location cmdlet 640, except that the current location is pushed onto a stack before changing the current location to the new path. The Pop-location cmdlet 650 can pop a location from a stack and set the new path to that location.

Class for Relationship Provider 140 and Method Definition

Specified below is an illustrative class from which relationship providers 140 can derive. Functionality for this class may be implemented by overriding the abstract methods, as follows:

```
/// <summary>
/// The is the base class for all of the classes the provide relationships between
/// or within CmdletProviders.
/// </summary>
public abstract class RelationshipProvider
{
    /// <summary>
    /// Determines if the relationship is valid for the given set of information.
    /// </summary>
    ///
    /// <param name="fromPath">
    /// The path from which the relationship may originate.
    /// </param>
    ///
    /// <returns>
    /// True if the relationship is valid for the given fromPath, and optionally property and target.
    /// Or false if it is not.
    /// </returns>
    ///
    public abstract bool IsRelationshipValid (PathInfo fromPath);
    /// <summary>
    /// Determines if the relationship is valid for the given set of information.
    /// </summary>
    ///
    /// <param name="fromPath">
    /// The path from which the relationship may originate.
    /// </param>
    ///
    /// <param name="property">
    /// The property to use in determining the validity of the relationship.
    /// This parameter can be null or empty if the relationship does not require
    /// the parameter. See RelationshipParameterOptions for more information.
    /// </param>
    ///
    /// <param name="target">
```

-continued

```
    /// The target to use in determining the validity of the relationship.
    /// This parameter can be null or empty if the relationship does not require
    /// the parameter. See RelationshipParameterOptions for more information.
    /// </param>
    ///
    /// <returns>
    /// True if the relationship is valid for the given fromPath, and optionally property and target.
    /// Or false if it is not.
    /// </returns>
    ///
    public abstract bool IsRelationshipValid (PathInfo fromPath, string property);
    /// <summary>
    /// Maps the relationship from the specified path, using the specified property and target,
    /// to the other side of the relationship.
    /// </summary>
    ///
    /// <param name="fromPath">
    /// The path from which the relationship should originate.
    /// </param>
    ///
    /// <param name="property">
    /// The property to be used in resolving the relationship.
    /// This parameter can be null or empty if the relationship does not require
    /// the parameter. See RelationshipParameterOptions for more information.
    /// </param>
    ///
    /// <param name="target">
    /// The target to be used as the destination of the relationship.
    /// This parameter can be null or empty if the relationship does not require
    /// the parameter. See RelationshipParameterOptions for more information.
    /// </param>
    ///
    /// <returns>
    /// An MshPath that is the path to the destination of the relationship.
    /// </returns>
    ///
    public abstract string ResolveRelationship (PathInfo fromPath, string property, string target);
        /// <summary>
        /// Gets the targets for the relationship at the given path using the specified property.
        /// </summary>
        ///
        /// <param name="fromPath">
        /// The path from which to get the relationship targets.
        /// </param>
        ///
        /// <param name="property">
        /// The property to use when getting the target.
        /// This may be empty or null if the relationship does not require the property parameter.
        /// See RelationshipParameterOptions for more information.
        /// </param>
        ///
        /// <returns>
        /// A collection of strings that represent the valid targets of the relationship.
        /// </returns>
        ///
        public abstract Collection<string> GetRelationshipTargets (PathInfo fromPath, string property);
        /// <summary>
        /// Gets the localized description of the provider.
        /// </summary>
        ///
        public abstract string Description { get; }
        /// <summary>
        /// The information about the relationship provider that is stored
```

-continued

```
        /// in the engine on behalf of the provider.
        /// </summary>
        ///
        public RelationshipProviderInfo RelationshipProviderInfo { get; }
        /// <summary>
        /// Gets the instance of the provider interface APIs for the
current context
        /// </summary>
            /// <value></value>
        public ProviderIntrinsics InvokeProvider { get; }
        /// <summary>
        /// Gets the instance of session state for the current context.
        /// </summary>
        public SessionState SessionState { get; }
    }
```

RelationshipProviderInfo Class

Specified below is an illustrative class suitable for representing the relationship 160 to the end user 105. It can contain the information to load the relationship provider 140.

```
public sealed class RelationshipProviderInfo
{
    /// <summary>
    /// Gets the name of the relationship
    /// </summary>
    ///
    public string Name { get; }
    /// <summary>
    /// Gets the path to the .relationshipprovider file that was
    /// used to load the relationship provider.
    /// </summary>
    ///
    public string Path { get; }
    /// <summary>
    /// Gets the provider name from which this relationship
originates.
    /// </summary>
    ///
    public string FromProvider { get; }
       /// <summary>
    /// Gets the provider to which the relationship maps
    /// </summary>
    ///
    public string ToProvider { get; }
    /// <summary>
    /// Gets the assembly information about the assembly that
implements
    /// the relationship.
    /// <summary>
    ///
    public AssemblyInfo AssemblyInfo { get; }
    /// </summary>
    /// Gets the Type that implements the relationship
    /// </summary>
    ///
    /// <throws>
    /// FileNotFoundException if the assembly could not be found.
    /// BadImageFormatException if the file is not a valid assembly.
    /// SecurityException if the caller does not have the required
permission.
    /// MissingMethodException if the type does not have default
constructor.
    /// ArgumentException if the type name exceeds 1024 characters.
    /// </throws>
    ///
    public Type Type { get; }
    /// <summary>
    /// Gets the parameters options for the relationship provider.
    /// </summary>
    public RelationshipParameterOptions ParameterOptions;
    /// <summary>
    /// Gets the description for the relationship provider
    /// </summary>
```

-continued

```
    ///
    public string Description { get; set; }
}
```

RelationshipProviderManagementIntrinsics

Specified below are illustrative APIs that can be exposed to cmdlets 620 for managing which relationships 160 are loaded and for getting information about those relationships 160. They can be accessed through SessionState.Relationship.*

```
    /// <summary>
    /// Exposes the Relationship Providers to the Cmdlet base class. The
methods of this class
    /// get and set data in session state associated with relationship
providers.
    /// </summary>
    ///
    public sealed class RelationshipProviderManagementIntrinsics
    {
        /// <summary>
        /// Gets all the relationships that have been loaded.
        /// </summary>
        ///
        /// <returns>
        /// A collection of the relationship information for the
        /// relationships that have been loaded.
        /// </returns>
        public Collection<RelationshipProviderInfo> GetAll( );
        /// <summary>
        /// Gets all the relationships of the given name.
        /// </summary>
        ///
        /// <param name="name">
        /// The name of the relationship to get. The name may contain
wildcard characters
        /// which will be expanded to match the relationship names.
        /// </param>
        ///
        /// <returns>
        /// The relationship information for the relationships that match
the specified name.
        /// </returns>
        ///
        public Collection<RelationshipProviderInfo> GetAll(string name);
        /// <summary>
        /// Gets the valid relationships for the given path, filtering
based on the
        /// name, fromProvider, and/or toProvider.
        /// </summary>
        ///
        /// <param name="name">
        /// The name of the relationships to filter on. The name may
contain
        /// wildcard characters.
        /// </param>
        ///
        /// <param name="path">
        /// The path to get the valid relationships for.
        /// </param>
        ///
        /// <param name="toProvider">
        /// The toProvider of the relationships to filter on. The
toProvider may
        /// contain wildcard characters.
        /// </param>
        ///
        /// <returns>
        /// A collection of the valid relationships for the given path
and filters.
        /// </returns>
        ///
        /// <throws>
        /// ArgumentException -
```

-continued

```
    ///     - if the path is empty or null or points to a file that
does not have a
    ///         .relationshipprovider extension.
    ///     - if the FromProvider definition of the relationship
provider contains wildcard
    ///         characters.
    ///     - if a relationship with the same Name and FromProvider
already exists
    ///
    /// FormatException -
    ///     - if the path points to a file that does not have the
correct file format.
    ///     - if the FromProvider or ToProvider that is defined in
the file is null or empty
    ///     - if the relationship's parameter options are not present
in the file.
    ///
    /// IOException -
    ///     - if an I/O error occurs while reading the file.
    ///
    /// SecurityException -
    ///     - the caller does not have the required permission to
read the file
    ///
    /// DirectoryNotFoundException -
    ///     - The specified path is invalid, such as being on an
unmapped drive
    ///
    /// UnauthorizedAccessException -
    ///     - The access requested is not permitted by the operating
    ///
    /// PathTooLongException -
    ///     - The specified path, file name, or both exceed the
system-defined maximum
    ///         length.
    ///
    /// </throws>
    public Collection<RelationshipProviderInfo> GetAll(string name,
string path, string toProvider);
    /// <summary>
    /// Gets the relationship for the specified name and fromProvider
    /// </summary>
    ///
    /// <param name="name">
    /// The name of the relationship to get.
    /// </param>
    ///
    /// <param name="fromProvider">
    /// The name of the CmdletProvider from which the relationship
originates.
    /// </param>
    ///
    /// <returns>
    /// The information about the relationship.
    /// </returns>
    ///
    public RelationshipProviderInfo Get(string name, string
fromProvider);
    public Collection<RelationshipProviderInfo> New(string path);
    public void Remove(string name, string fromProvider);
}
```

RelationshipParameterOptions

```
    [Flags]
    public enum RelationshipParameterOptions
    {
        None,
        PropertyAvailable,
        PropertyRequired,
        TargetPathAvailable,
        TargetPathRequired
    }
```

RelationshipProviderAttribute

```
    [AttributeUsageAttribute(..)]
    public class RelationshipProviderAttribute : Attribute {
        public RelationshipProviderAttribute (string name, string
fromProvider, string toProvider, RelationshipParamaterOptions
parameterOptions);
        public string Name { get; }
        public string FromProvider { get; }
        public string ToProvider { get; }
        public RelationshipParamaterOptions ParameterOptions { get; }
    }
```

Figure 7:
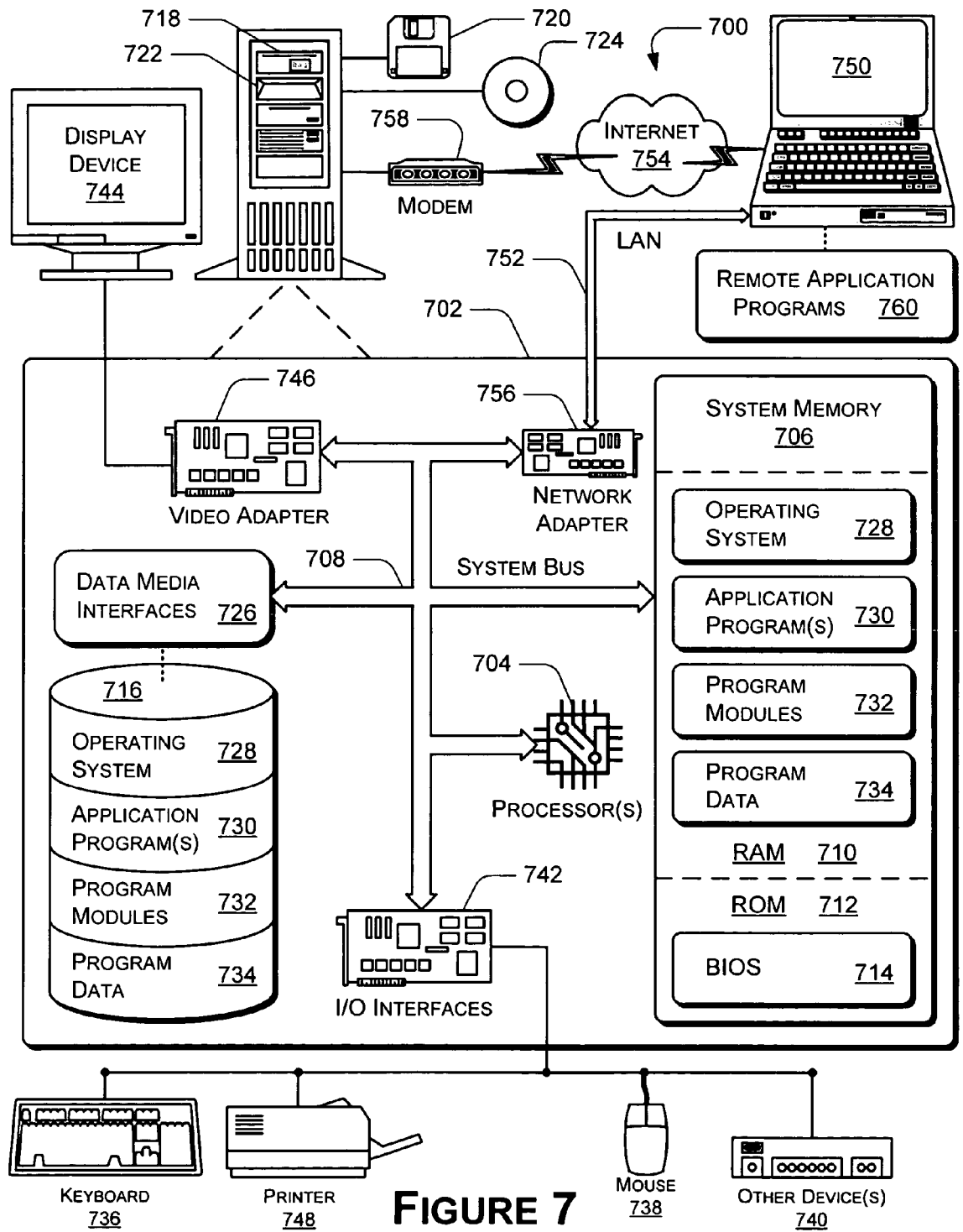
FIG. 7 illustrates an exemplary computing environment within which systems and methods for dynamically exposing relationships among entities contained in data stores, as well as the architectures and/or described herein, can be either fully or partially implemented.

FIG. 7 illustrates an exemplary computing environment 700 within which systems and methods for dynamically exposing relationships among entities contained in data stores, as well as the architectures 100 and/or 200 described herein, can be either fully or partially implemented. Exemplary computing environment 700 is only one example of a computing system and is not intended to suggest any limitation as to the scope of use or functionality of the architectures. Neither should the computing environment 700 be interpreted as having any dependency or requirement relating to any one or combination of components illustrated in the exemplary computing environment 700.

The computer and network architectures in computing environment 700 can be implemented with numerous other general purpose or special purpose computing system environments or configurations. Examples of well known computing systems, environments, and/or configurations that may be suitable for use include, but are not limited to, personal computers, server computers, client devices, hand-held or laptop devices, microprocessor-based systems, multiprocessor systems, set top boxes, programmable consumer electronics, network PCs, minicomputers, mainframe computers, gaming consoles, distributed computing environments that include any of the above systems or devices, and the like.

The computing environment 700 includes a general-purpose computing system in the form of a computing device 702. The components of computing device 702 can include, but are not limited to, one or more processors 704 (e.g., any of microprocessors, controllers, and the like), a system memory 706, and a system bus 708 that couples the various system components. The one or more processors 704 process various computer executable instructions to control the operation of computing device 702 and to communicate with other electronic and computing devices. The system bus 708 represents any number of several types of bus structures, including a memory bus or memory controller, a peripheral bus, an accelerated graphics port, and a processor or local bus using any of a variety of bus architectures.

Computing environment 700 includes a variety of computer readable media which can be any media that is accessible by computing device 702 and includes both volatile and non-volatile media, removable and non-removable media. The system memory 706 includes computer readable media in the form of volatile memory, such as random access memory (RAM) 710, and/or non-volatile memory, such as read only memory (ROM) 712. A basic input/output system (BIOS) 714 maintains the basic routines that facilitate information transfer between components within computing device 702, such as during start-up, and is stored in ROM 712. RAM 710 typically contains data and/or program modules that are immediately accessible to and/or presently operated on by one or more of the processors 704.

Computing device 702 may include other tangible removable/non-removable, volatile/non-volatile computer storage media. By way of example, a hard disk drive 716 reads from and writes to a non-removable, non-volatile magnetic media (not shown), a magnetic disk drive 718 reads from and writes to a removable, non-volatile magnetic disk 720 (e.g., a "floppy disk"), and an optical disk drive 722 reads from and/or writes to a removable, non-volatile optical disk 724 such as a CD-ROM, digital versatile disk (DVD), or any other type of optical media. In this example, the hard disk drive 716, magnetic disk drive 718, and optical disk drive 722 are each connected to the system bus 708 by one or more data media interfaces 726. The disk drives and associated computer readable media provide non-volatile storage of computer readable instructions, data structures, program modules, and other data for computing device 702.

Any number of program modules can be stored on RAM 710, ROM 712, hard disk 716, magnetic disk 720, and/or optical disk 724, including by way of example, an operating system 728, one or more application programs 730, other program modules 732, and program data 734. Each of such operating system 728, application program(s) 730, other program modules 732, program data 734, or any combination thereof, may include one or more embodiments of the systems and methods described herein.

Computing device 702 can include a variety of computer readable media identified as communication media. Communication media typically embodies computer readable instructions, data structures, program modules, or other data and includes any information delivery media. By way of example and not limitation, communication media includes wired media such as a wired network or direct-wired connection, and wireless media such as acoustic, RF, infrared, other wireless media, and/or any combination thereof.

A user can interface with computing device 702 via any number of different input devices such as a keyboard 736 and pointing device 738 (e.g., a "mouse"). Other input devices 740 (not shown specifically) may include a microphone, joystick, game pad, controller, satellite dish, serial port, scanner, and/or the like. These and other input devices are connected to the processors 704 via input/output interfaces 742 that are coupled to the system bus 708, but may be connected by other interface and bus structures, such as a parallel port, game port, and/or a universal serial bus (USB).

A display device 744 (or other type of monitor) can be connected to the system bus 708 via an interface, such as a video adapter 746. In addition to the display device 744, other output peripheral devices can include components such as speakers (not shown) and a printer 748 which can be connected to computing device 702 via the input/output interfaces 742.

Computing device 702 can operate in a networked environment using logical connections to one or more remote computers, such as remote computing device 750. By way of example, remote computing device 750 can be a personal computer, portable computer, a server, a router, a network computer, a peer device or other common network node, and the like. The remote computing device 750 is illustrated as a portable computer that can include any number and combination of the different components, elements, and features described herein relative to computing device 702.

Logical connections between computing device 702 and the remote computing device 750 are depicted as a local area network (LAN) 752 and a general wide area network (WAN) 754. Such networking environments are commonplace in offices, enterprise-wide computer networks, intranets, and the Internet. When implemented in a LAN networking environment, the computing device 702 is connected to a local network 752 via a network interface or adapter 756. When implemented in a WAN networking environment, the computing device 702 typically includes a modem 758 or other means for establishing communications over the wide area network 754. The modem 758 can be internal or external to computing device 702, and can be connected to the system bus 708 via the input/output interfaces 742 or other appropriate mechanisms. The illustrated network connections are merely exemplary and other means of establishing communication link(s) between the computing devices 702 and 750 can be utilized.

In a networked environment, such as that illustrated with computing environment 700, program modules depicted relative to the computing device 702, or portions thereof, may be stored in a remote memory storage device. By way of example, remote application programs 760 are maintained with a memory device of remote computing device 750. For purposes of illustration, application programs and other executable program components, such as operating system 728, are illustrated herein as discrete blocks, although it is recognized that such programs and components reside at various times in different storage components of the computing device 702, and are executed by the one or more processors 704 of the computing device 702.

Although embodiments of dynamically exposing relationships among entities contained in data stores have been described in language specific to structural features and/or methods, it is to be understood that the subject of the appended claims is not necessarily limited to the specific features or methods described. Rather, the specific features and methods are disclosed as exemplary implementations of dynamically exposing relationships among entities contained in data stores.

What is claimed is:

1. One or more computer readable storage media comprising computer executable instructions that, when executed, direct a computing device for:

creating a file by running an export-command on an assembly containing at least one relationship provider, wherein the file is created by utilizing an attribute of the at least one relationship provider, wherein the at least one relationship provider is a Cmdlet;

identifying environment variables for the file comprising the at least one relationship provider;

loading the at least one relationship provider that is identified from the environment variables for the file, wherein the at least one relationship provider is plugged in a relationship engine when data store is added and the relationship provider is unplugged in the relationship provider engine when the data store is removed;

adding the data store to the assembly;

receiving data related to a first object that is contained in the data store by the at least one relationship provider that corresponds to the data store, wherein the data is of a form that is compatible with a relationship provider engine;

exposing the data to the relationship provider engine by the at least one relationship provider;

accessing the data received the at least one relationship provider by the relationship provider engine;

defining a relationship between the first object and a second object within the exposed data by the relationship provider engine using an application programming interface (API), wherein the API is consumed by the relationship provider;

showing the relationship between the first object and the second object in the data store to a user by the relation provider engine using the API;

implementing a relationship provider base class on the at least one relationship provider, wherein the relationship provider base class is an abstract class and the relationship provider base class comprises:

attributes that represent a relationship between the first object and the second object comprising:

a relationship name field that identifies the relationship;

a first relationship provider field that identifies a first relationship provider or a data store from which the relationship originates;

a second relationship provider field that identifies a second relationship provider or a data store to which the relationship maps;

a Description Property that describes the relationship as a localized string; and functions to respond to a navigation command from a user comprising:

an IsRelationshipValid function that returns true if the relationship is valid for a path, a property, and a target;

a GetRelationshipTargets function that returns targets possible to traverse based on a specified path;

a ResolveRelationship function that receives a path in the first relationship provider and returns a path to the second relationship provider, and a CanResolveRelationship function that returns true if an input relationship can be resolved from the first relationship provider to the second relationship provider, analyzing the data received by the at least one relationship provider by utilizing the attributes, which are of the implemented relationship provider base class on the at least one relationship provider and which correspond to the first object and the second object, to determine dynamically a relationship between the first object and the second object, wherein the analyzing is performed by the relationship provider engine using the API;

receiving the navigation command from the user; and showing the relationship between the first object and the second object to the user using at least one function of the implemented relationship provider base class on the at least one relationship provider when the navigation command from the user is received.

2. The one or more computer readable storage media of claim 1, wherein the computer executable instructions include instructions that direct the computing device to receive data representing a type or property of the first object.

3. The one or more computer readable storage media of claim 1, wherein the computer executable instructions include instructions that direct the computing device to receive data related to the first object and the second object, both of which are contained in the data store.

4. The one or more computer readable storage media of claim 1, wherein the computer executable instructions include instructions that direct the computing device to receive data related to the first object and to the second object, wherein the second object is contained in a second data store other than the data store containing the first object.

5. The one or more computer readable storage media of claim 1, further comprising computer executable instructions that direct the computing device to link the first object to the second object to indicate the relationship between the first object and the second object.

6. The one or more computer readable storage media of claim 1, further comprising computer executable, instructions that direct the computing device to provide a visual representation of the relationship between the first object and the second object to a user.

7. The one or more computer readable storage media of claim 6, wherein the computer executable instructions direct the computing device to provide a visual representation including a graphic icon that is displayed to the user and that represents the relationship.

8. The one or more computer readable storage media of claim 6, wherein the computer executable instructions direct the computing device to provide a visual representation that includes hyper-text that is displayed to the user and that represents the relationship.

9. The one or more computer readable storage media of claim 1, further comprising computer executable instructions that direct the computing device to facilitate navigation from the first object and the second object.

10. A method implemented on a computing device having instructions executable by a processor, the method comprising:

receiving data related to an object that is contained in a data store by at least one relationship provider, wherein the at least one relationship provider is a Cmdlet, that corresponds to the data store;

exposing the data by the at least one relationship provider to a relationship provider engine, wherein the relationship provider engine loads, manipulates, and surfaces a relationship corresponding to the object that is contained in the data store through an application programming interface consumed by the at least one relationship provider;

adding the data store to the assembly;

accessing the data received at the at least one relationship provider by the relationship provider engine, each relationship provider corresponding to one or more data stores, wherein the relationship provider engine shows the relationship between objects in one or more data stores to a user;

implementing a relationship provider base class on the at least one relationship provider, wherein the relationship provider base class is an abstract class and the relationship provider base class comprises:

one or more attributes that represent a relationship between the first object and the second object by;

a relationship name field that identifies the relationship;

a first relationship provider field that identifies a first relationship provider or a data store from which the relationship originates;

a second relationship provider field that identifies a second relationship provider or a data store to which the relationship maps;

a Description Property that describes the relationship as a localized string; and one or more functions to respond to a command from a user comprising:

an IsRelationshipValid function that returns true if the relationship is valid for a path, a property, and a target;

a GetRelationshipTargets function that returns targets possible to traverse based on a specified path;

a ResolveRelationship function that receives a path in the first relationship provider and returns a path to the second relationship provider, and a CanResolveRelationship function that returns true if an input relationship can be resolved from the first relationship provider to the second relationship provider;

analyzing the data received by the at least one relationship provider by utilizing the one or more attributes, which are of the implemented relationship provider base class on the at least one relationship provider and which correspond to the first object and second object, to determine dynamically the relationship between the first object and the second object, wherein the analyzing is performed by the relationship provider engine using an application programming interface (API);

receiving the command from the user; and depicting visually the relationship between the first object and the second object to the user using at least one function of the implemented relationship provider base class on the at least one relationship provider, wherein the depicting visually comprises rendering a depiction in a manner distinguishable from a static directory content, the manner comprising at least one of: a coloration, a typeface, a hyper-text, or a graphic icon.

11. The method of claim 10, further comprising enabling the user to navigate the relationship.

12. The method of claim 10, further comprising enabling the user to navigate directly from the first object to the second object.

13. The method of claim 10, further comprising enabling the user to navigate from the first object to the second object by interacting with a representation of the relationship provided in a file directory listing.

14. The method of claim 10, further comprising updating the relationship dynamically in response to a change in at least one of the first object and the second object.

* * * * *